United States Patent [19]

Levers

[11] Patent Number: 5,276,389
[45] Date of Patent: Jan. 4, 1994

[54] METHOD OF CONTROLLING A WINDSHIELD WIPER SYSTEM

[75] Inventor: Juergen Levers, Bochum, Fed. Rep. of Germany

[73] Assignee: Leopold Kostal GmbH & Co. KG, Ludenscheid, Fed. Rep. of Germany

[21] Appl. No.: 988,769

[22] Filed: Dec. 10, 1992

Related U.S. Application Data

[63] Continuation-in-part of Ser. No. 989,052, Dec. 10, 1992.

[30] Foreign Application Priority Data

Dec. 14, 1991 [DE] Fed. Rep. of Germany ....... 4141348

[51] Int. Cl.$^5$ .............................................. B60S 1/08
[52] U.S. Cl. ............................. 318/444; 318/DIG. 2; 388/907.5; 388/916
[58] Field of Search ............... 318/443, 444, 480, 483, 318/DIG.2; 15/250.12, 250.13, 250.17; 388/907.5, 916

[56] References Cited

U.S. PATENT DOCUMENTS

| | | |
|---|---|---|
| 3,947,131 | 3/1976 | Karl . |
| 4,481,450 | 11/1984 | Watanabe et al. ................ 318/444 |
| 4,588,935 | 5/1986 | Kaneiwa et al. .................. 318/483 |
| 4,595,866 | 6/1986 | Fukatsu et al. ................... 318/444 |
| 4,639,831 | 1/1987 | Iyoda ................................. 361/286 |
| 4,798,956 | 1/1989 | Hochstein ......................... 250/341 |
| 4,859,867 | 8/1989 | Larson et al. ..................... 307/10.1 |
| 4,867,561 | 9/1989 | Fujii et al. ......................... 318/483 X |
| 4,916,374 | 4/1990 | Schierbeek et al. ............... 318/483 |
| 5,015,931 | 5/1991 | Muller ................................. 318/483 |
| 5,140,234 | 8/1992 | Wallrafen .......................... 318/444 X |
| 5,157,312 | 10/1992 | Wallrafen .......................... 318/483 X |
| 5,200,676 | 4/1993 | Mueller et al. ................... 318/444 |

FOREIGN PATENT DOCUMENTS 3314770 12/1987 Fed. Rep. of Germany .

*Primary Examiner*—Bentsu Ro
*Attorney, Agent, or Firm*—Brooks & Kushman

[57] ABSTRACT

A method for controlling a vehicular windshield wiping system, the wiping system being controlled in response to recognition of a particular rain pattern, and being capable of distinguishing between the presence of moisture and dirt on the windshield. The wiping system is also controlled according to a plurality of operating thresholds established to ensure smooth operation of the wiping system during varying conditions, and is controlled according an amplification autoranging strategy to ensure the wiping system functions properly independent of certain conditions, such as the type of windshield on the vehicle. The wiping system includes at least one wiper blade, and a sensor mounted to the windshield for monitoring a portion of the windshield. The sensor generates a signal having a value which varies as both moisture and dirt collect on the monitored portion.

37 Claims, 11 Drawing Sheets

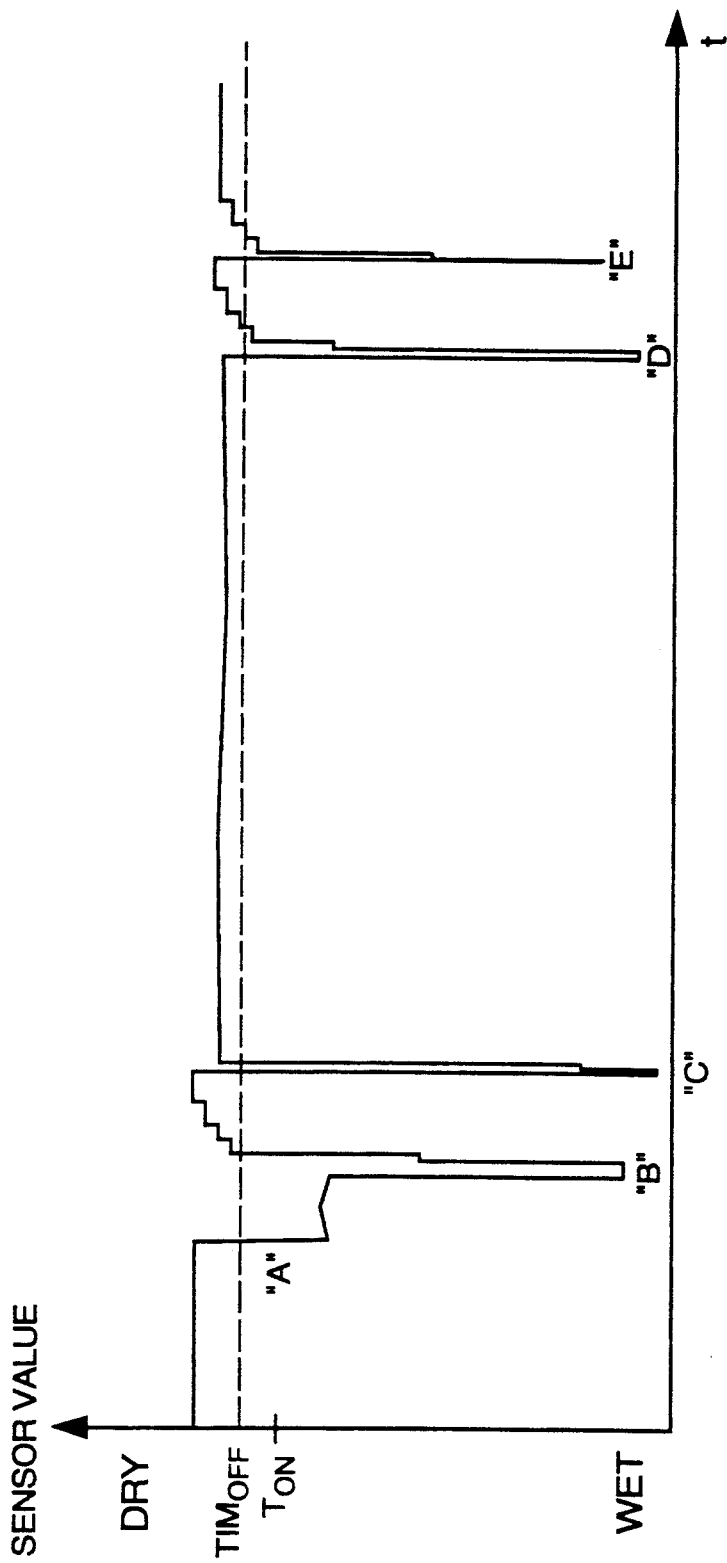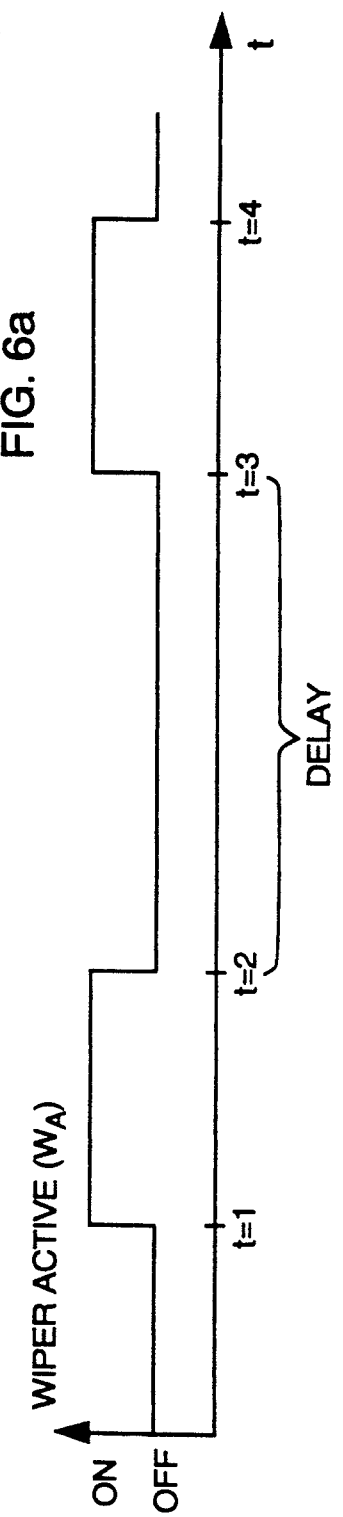
FIG. 6a
FIG. 6b

METHOD OF CONTROLLING A WINDSHIELD WIPER SYSTEM

CROSS-REFERENCE TO RELATED APPLICATION

This application is a continuation-in-part of copending U.S. Pat. application Ser. No. 07/989,052, filed Dec. 10, 1992, titled "Apparatus And Method For Controlling A Windshield Wiping System" filed herewith, the specification of which is hereby expressly incorporated by reference in its entirety.

TECHNICAL FIELD

The present invention relates to windshield wiper systems and, more particularly, to a method for automatic control of a windshield wiper system.

BACKGROUND ART

Automatically controlled windshield wiping systems typically detect the presence of a liquid or a solid coating on the windshield of an automobile. Depending on the type and quantity of coating present on the windshield, the wiper system is activated to clean the windshield, operating in either an intermittent mode, wherein a varying time delay is inserted between consecutive wipes, or a continuous mode, wherein there is no time delay between consecutive wipes.

For example, U.S. Pat. No. 3,947,131, issued to Karl, discloses a windshield soil detector. A glass pane soil indicator is secured to the unexposed surface of the windshield. A light source and a first optical system direct a beam of light through the unexposed surface to the exposed surface at the angle of total reflection. A second optical system is arranged to allow the beam to pass from the windshield to a photometer. A single transmitting device is arranged to produce a signal indicative of the light returned through the windshield to the photometer. Light sent from the light source is conducted through prismatic devices as it enters or leaves the windshield, so as to allow the light to strike the soiled glass surface at the angle of total reflection. In this way, outside light which strikes the windshield from the outside is always broken at an angle into the interior of the glass, such that no bothersome outside light can reach the photometer. Therefore, no compensation must be made for outside light and the detector can be used during daylight and under changing outside light conditions.

U.S. Pat. No. 4,481,450, issued to Watanabe et al., discloses a windshield-mounted system for controlling a vehicle window and the like. The control system includes first means for emitting a beam of radiation into a section of the windshield from the inner surface thereof at such an angle of incidence that the beam reflects off of the outer surface of the windshield. The system also includes second means for detecting and converting the reflected beam into a first signal, and third means for comparing the first signal with a reference value to generate a second signal. The system also includes means, such as a reversible motor, responsive to the second signal for closing the window of the vehicle.

U.S. Pat. No. 4,798,956, issued to Hochstein, discloses a sensing assembly and method for indicating when moisture or other particles have accumulated on a window. An emitter means is included for disposition on the inside of the window for emitting radiant energy to the window on an ingress axis at an incident angle relative to the inside surface. A detector is included for disposition on the inside of the window for detecting radiant energy from the window on an egress axis at a reflection angle relative to the inside surface and equal to the incident angle. Support means support the emitter and detector for spacing the point of intersection of the ingress axis with the inner surface of the window from a point of intersection of the egress axis with the inner surface of the window at a predetermined distance. The sensing assembly also includes limiting means for limiting the field of view of radiant energy from the window entering the detector by allowing to pass only radiant energy substantially parallel with the egress axis within the field of view.

SUMMARY OF THE INVENTION

It is an object of the present invention to provide an improved method of controlling a windshield wiping system.

It is a further object of the present invention to provide a method for accurately controlling a windshield wiping system during a rain pattern consisting of widely scattered drops.

It is yet still a further object of the present invention to provide a method for controlling a windshield wiping system, capable of distinguishing between the presence of moisture and dirt on the windshield, so as to wipe when moisture is present.

It is a further object of the present invention to provide a method for controlling a windshield wiping system wherein a plurality of operating thresholds are established, ensuring smooth operation of the wiping system during varying conditions.

It is a further object of the present invention to provide a method of controlling a windshield wiping system according an amplification autoranging strategy to ensure the wiping system functions properly independent of certain conditions, such as the type of windshield.

In carrying out the above objects and other objects and features of the present invention, a method is provided for controlling a vehicular windshield wiping system. The wiping system includes a sensor mounted to the windshield for monitoring a portion of the windshield and generating a signal. The method comprises the step of detecting the presence of at least one falling edge in the sensor signal, the at least one falling edge indicating the presence of moisture on the portion of the windshield. The method also comprises the steps of identifying the shape of the at least one falling edge, the wiping system identifying at least one rain pattern based on the shape and number of falling edges during a predetermined period of time, and controlling the windshield wiping system based on the identified rain pattern.

In further carrying out the above objects, and other objects and features of the present invention, a method is provided for controlling a vehicular windshield wiping system. The wiping system includes at least one wiper blade, and a sensor mounted to the windshield for monitoring a portion of the windshield, the sensor generating a signal having a value which varies as both moisture and dirt collect on the monitored portion, the wiper system being activated when the sensor value crosses a switch-on threshold. The method comprises the steps of determining a first sensor value when the monitored portion is substantially free of moisture, the first sensor value being less than the maximum possible sensor value due to the presence of dirt on the monitored portion, thereby allowing the wiper system to distinguish between the presence of moisture and dirt on the monitored portion. The method also comprises the step of modifying the sensitivity of the device based on the first sensor value, insuring the wiper system is activated due only to the presence of moisture on the monitored portion.

Preferably, the method also comprises the step of activating the wiper system for at least one wipe cycle when the sensor value drops below the switch-on threshold, the at least one wiper blade leaving a resting position and wiping the windshield, passing over the monitored portion of the windshield at least once. Also preferably, the first sensor value is determined after the at least one wiper blade passes over the monitored portion of the windshield for the last time during the wipe cycle, the monitored portion being substantially dry after the blade passes.

In still further carrying out the above objects, and other objects and features of the present invention, a method is provided for controlling a vehicular windshield wiping system including at least one windshield wiper and a sensor mounted to the windshield for monitoring a portion of the windshield wiped by the wiper during each wipe cycle. The sensor generates a signal having a value which varies as a coating collects on the monitored portion of the windshield. The method comprises defining a connection threshold, based on the sensor signal, for starting operation of the windshield wiping system and defining a first disconnection threshold, based on the sensor signal, for ceasing operation of the windshield wiping system in a first mode of operation. The method also comprises defining a second disconnection threshold, based on the sensor signal, for ceasing operation of the windshield wiping system in a second mode of operation.

In still further carrying out the above objects, and other objects and features of the present invention, a method is provided for controlling a vehicular windshield wiping system including a motor, at least one windshield wiper and an optoelectronic sensor mounted to the windshield for monitoring a portion of the windshield wiped by the wiper during each wipe cycle. The sensor includes infrared beam transmitters for emitting beams and infrared beam receivers for receiving the emitted beams, the emitted beams being modified based on the coating on the windshield, the sensor generating a signal having a value which varies as a coating collects on the monitored portion of the windshield. The method comprises establishing a data window having a first plurality of values based on the sensor signal and establishing a measurement range within the data window, the measurement range having a second plurality of values defined by an upper threshold and a lower threshold. The method also comprises modifying the amplification of the beams emitted by the beam transmitters if the sensor signal has a value which is outside of the measurement range.

The advantages accruing to the present invention are numerous. For example, the windshield wiping system is properly controlled during different rain patterns such as widely scattered drops, drizzle, continuous rain, snow, fog and the like.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIGS. 6a and 6b are a graphical illustration of a typical sensor signal indicating a single drop rain pattern, for use with the present invention;

BEST MODE FOR CARRYING OUT THE INVENTION

Figure 1:
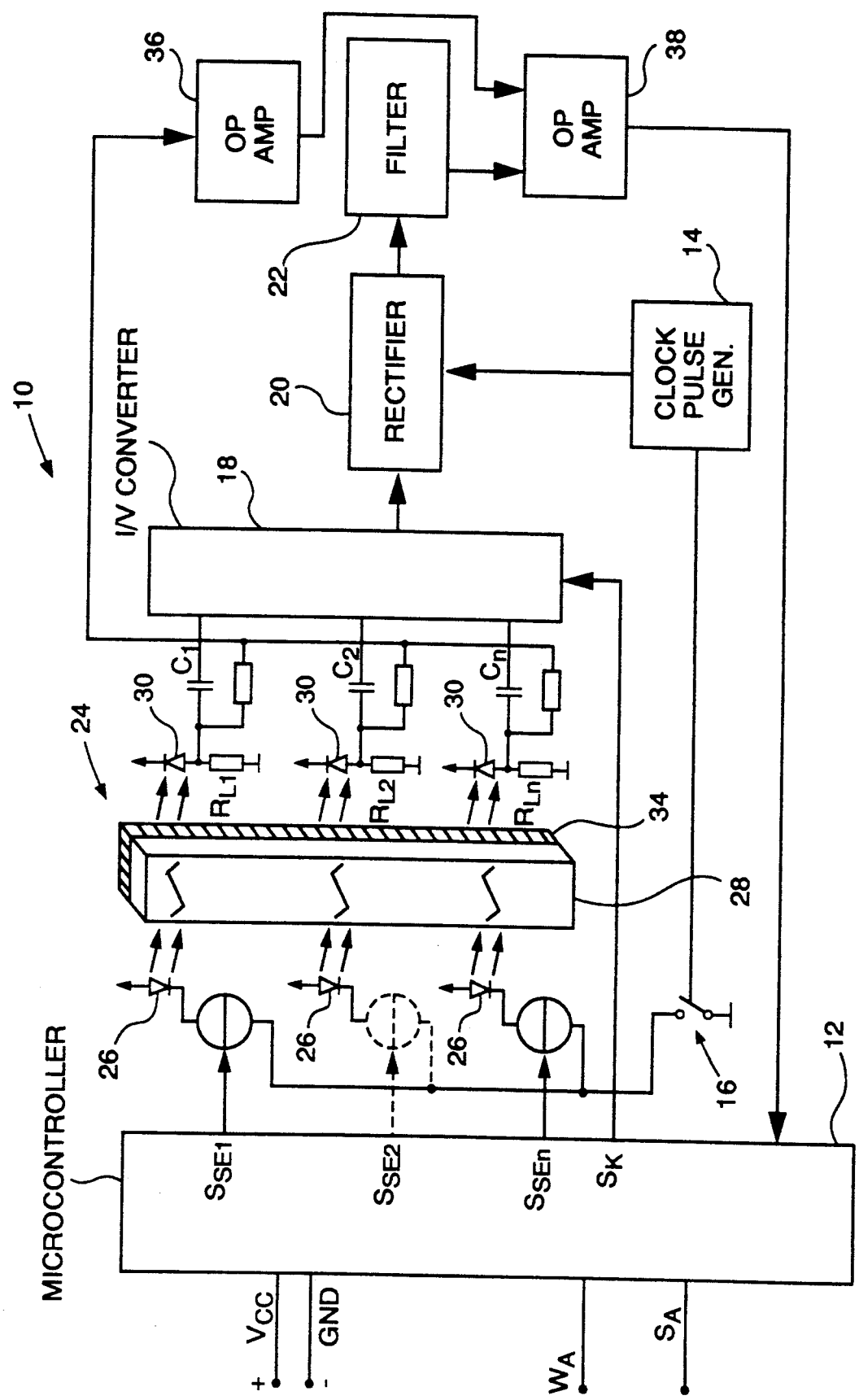
FIG. 1 is a block diagram of the electronic control unit of the windshield wiping system for carrying out the method of the present invention.

Referring now to FIG. 1, there is illustrated a block diagram of an apparatus, shown generally by reference numeral 10, for controlling a windshield wiping system. As illustrated, the apparatus preferably includes a microcontroller 12, a frequency generator 14 which cooperates with a switch 16, a current-to-voltage (I/V) converter 18, a phase-selective rectifier 20 and a filter 22. The apparatus 10 also preferably includes an optoelectronic assembly, shown generally by reference numeral 24, including a plurality of infrared beam transmitters 26, a beam guide element 28 including lenses and a plurality of infrared beam receivers 30 for evaluating conditions existing on the windshield 34. Most preferably, the beam transmitters 26, the beam guide 28, the beam receivers 30 and the electronic componentry are formed as an optoelectronic sensor mounted on the inside surface of a vehicular windshield, not specifically illustrated. It should be appreciated that although the windshield wiping system is shown to be controlled by a microprocessor, the system could also be controlled by an analog and/or digital switching system, or the like. The surface area of the sensor defines an area of the windshield, referred to herein as the sensor active area, monitored by the sensor. One wiper blade passes over the sensor active area twice during each wipe cycle—once leaving the resting position and once returning to the resting position.

Each infrared beam transmitter 26 on the one side (the input side) of the beam guide element 28 has an associated infrared beam receiver 30 on the opposite side (the output side) of the beam guide element. In the preferred embodiment, the infrared beam transmitters 26 are infrared light emitting diodes (LEDs), such as part number SFH485P, commercially available from Siemens Components, Inc., of Cupertino, Calif., United States of America. The beam receivers are preferably infrared photodiodes having a non-linear characteristic, such as part number SFH205, also commercially available from Siemens Components, Inc.

As shown in FIG. 1, the apparatus 10 also includes a pair of operational amplifiers 36 and 38 for processing signals from the beam receivers 30 and the filter 22. The microcontroller 12 processes the signal received from the operational amplifier 38 and accordingly controls operation of the vehicular windshield wiping system including a motor, not specifically illustrated, via control output SA, and a control input WA (Wiper Active) as described in greater detail below.

The sensor device 10 is powered via electrical connections to a power supply, such as a vehicle battery, through the Vcc and GND inputs. The transmitting current of the infrared beam transmitters 26 is set via the control outputs $S_{SEI}$ to $S_{SEN}$ of the microcontroller 12. In the preferred embodiment, the infrared beam transmitters 26 of the optoelectronic assembly 24 are energized with a pulse-width modulated voltage at a frequency of at least 2 kHz. This modulation gives rise to a signal originating from the transmitters 26 in the form of an alternating signal which, for evaluation of the conditions existing on the windshield 34, is supplied to the infrared beam receivers 30 via the beam guide 28. The light emitted by the infrared beam transmitters 26 is converted by the infrared beam receivers 30 and associated resistors into an electrical quantity representing a useful signal. Since the beam receivers 30 have a non-linear characteristic, the useful signal is non-linear when differing ambient light conditions prevail.

The useful signal thus produced is additionally dependent upon the ambient temperature, since the efficiency of the beam transmitters 26 and the beam receivers 30 is temperature-dependent. As a result, the useful signal is corrupted. To compensate for this temperature effect, the current sources for the beam transmitter are provided with temperature compensation. Alternatively, the microcontroller 12 can be provided with temperature information from at least one sensor not specifically illustrated. This sensor can be a thermistor, or an integrated circuit which functions like a thermistor. The transmitting current of the beam transmitters 26 can then be adjusted by the microcontroller 12 based on the temperature information, such that the output quantity is independent of the ambient temperature.

With continuing reference to FIG. 1, the light emerging from the beam guide 28 includes an interference signal in addition to the transmitted signal. The interference signal arises from the infrared light fractions of other parasitic light sources, such as the ambient light. Typically, these infrared light fractions are superimposed on the signal generated by the infrared beam receivers 30 and associated resistors and provided to the I/V converter 18.

Preferably, the voltage signal from the I/V converter 18 is processed by the phase selective rectifier 20, which cooperates with the frequency generator 14 to suppress glitch signals having a frequency which differs from that of the generator 14. Prior to processing by the I/V converter 18, the voltage signal is capacitively decoupled utilizing capacitors C1-Cn. Together, the capacitors and the rectifier 20 function to remove the superimposed interference signal from the received signal. The filter 22 preferably has a low-pass characteristic, which functions to smooth fluctuations in the voltage signal from the I/V converter 18 caused by rapid changes in ambient light. The output signal of the filter 22 is ultimately a measure of the coating, or degree of wetting, of the windshield. Some influences of the ambient light remain, however, having a disturbing effect upon the received signal.

With continued reference to FIG. 1, in addition to controlling the transmitting current of the infrared beam transmitters 26, the microcontroller 12 controls the conversion factor of the I/V converter 18 via the control output SK. By controlling the transmitting current and the conversion factor, the apparatus automatically adapts to widely differing measuring conditions, accurately controlling the windshield wiper system regardless of the type of windshield. This adaptation is desired because the damping factor of the optoelectronic assembly 24 is dependent upon the type of windshield utilized, such as clear glass, heat insulating glass without band-stop filter, or heat insulating glass with band-stop filter. As a result of adaptation, the apparatus is automatically switched into its optimum operating range.

In the preferred embodiment, the transmitting current control of the infrared beam transmitters 26 may be separately set to have a range of about 15 dB, i.e. 16 stages of about 1 dB for each of the beam transmitters. Also preferably, the conversion factor control of the I/V converter 18 may be set to have a range of about 50 dB, i.e. 6 stages each of about 10 dB. As a result, the apparatus 10 has available a continuous setting range of about 65 dB, in about 1 dB stages, for automatic adaptation. The setting values acquired are preferably stored in a non-volatile memory of the microcontroller 12 and are therefore available as starting values for each subsequent activation of the apparatus 10 without there being any need for renewed adaptation. As a result of overlapping of the setting ranges, component tolerances may also be compensated. To effect a sensitivity balance between the infrared beam transmitters 26 and the associated infrared beam receivers 30, the overlap region is further utilized in conjunction with the separate setting facilities of the beam transmitters 26, since only the total signal is converted by the I/V converter 14. This balance ensures that the sensitivity of each transmitter/receiver pair of the optoelectronic assembly 24 are substantially identical.

In particular, the ability to control the beam transmitting current and the conversion factor of the I/V converter 18 allows the apparatus to compensate for effects such as different windshield types, manufacturing tolerances and aging effects of the infrared beam transmitters 26 and the infrared beam receivers 30, tolerances in the trigger and evaluation electronics not specifically illustrated which cooperate with the apparatus 10, tolerances of the beam guide 28, and aging effects of the windshield (e.g. scratches from being hit by stones), to name a few.

One problem not adequately solved by the prior art relates to unwanted influences of the ambient light and continuous rapid changes in ambient light conditions, such as that which occur when driving along a tree-lined road (i.e. interplay of light and dark). The rapid changes can trigger the apparatus 10 into activating the windshield wiper system inadvertently. To eliminate these unwanted ambient light influences, the present invention incorporates load resistors RL1, RL2, ..., RLn, as shown in FIG. 1. The voltage drop at the load resistors RL1, RL2, ..., RLn is preferably used as a correcting quantity for operation and control of the windshield wiping system. This correction is also preferably used, for example, to prevent the output voltage from sliding below an interference level of the apparatus, as a result of ambient light influences. In the preferred embodiment, the interference level represents a threshold beyond which in all probability signal changes are to be evaluated as a coating present on the windshield.

As best shown in FIG. 1, the operational amplifier 36 is in electrical communication with the load resistors RL1, RL2, ..., RLn and processes the voltage drop at the load resistors into the correcting quantity, so as to linearize the useful signal. The output of the operational amplifier 36 is provided to the operational amplifier 38.

In addition to receiving the processed correcting quantity output from the operational amplifier 36, the operational amplifier 38 also receives, as an input quantity, the signal output from the filter 22. In the preferred embodiment, the operational amplifier 38 eliminates the variations in the useful signal caused by the ambient light by injecting the correcting quantity, thereby resulting in the formation of a linearized output voltage supplied to the microcontroller 12. This linearized output voltage is the sensor signal utilized by the microcontroller to control the windshield wiping system. Influences upon the useful signal which originate from the ambient light are, therefore, effectively eliminated.

Figure 2:
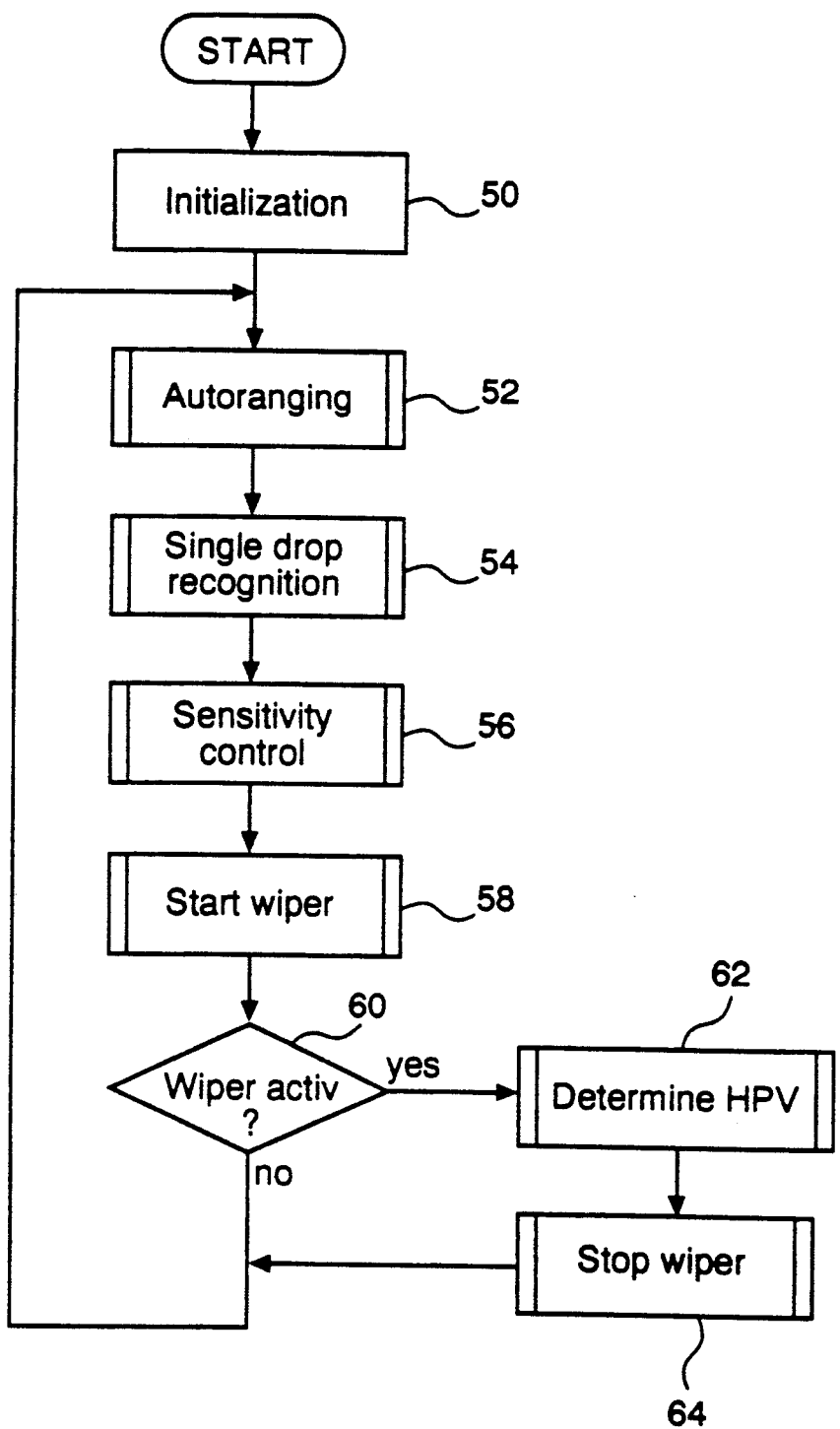
FIG. 2 is a flow chart illustrating the steps of the method of controlling a windshield wiping system of the present invention.

Referring now to FIG. 2, there is shown a high level flow chart illustrating the control flow executed by the apparatus 10 in controlling the windshield wiping system. Wiping of the windshield is generally a function of a moisture ratio value (MRV), which is calculated from the current sensor value and the last determined hundred percent value (HPV), as described in greater detail below. With reference to FIG. 1, the sensor value is that signal provided to the microcontroller 12 from the operational amplifier 38. The HPV reflects the maximum sensor value for a "dry" windshield and may be different than the highest possible value measured with a clean windshield, since it is measured regardless of the amount of dirt, salt, and the like present on the exterior surface of the windshield. These elements tend to decrease the sensor value, but are distinguishable from moisture by use of the HPV.

Generally, the moisture ratio value is compared to two dynamic parameters, referred to herein as a connection, or switch on, threshold ($T_{ON}$) and a disconnection, or switch off, threshold ($T_{OFF}$), to determine whether the windshield wipers should be activated or deactivated. In the preferred embodiment, these thresholds are expressed as a percentage of the HPV and can be modified or overridden based on specific conditions, as explained below. When the moisture ratio falls below the switch on threshold, the wipers are activated. When the moisture ratio is above the switch off threshold after a complete wipe cycle, the wipers are deactivated. The windshield wipers can be activated and deactivated under certain additional conditions: if the sensor value is out of range, and if a special type of rain pattern is detected, as described in greater detail below. Additionally, the apparatus may initiate a wipe cycle during intermittent mode of operation when the time delay between wipes has exceeded a predetermined set time.

This acts as a reminder to the vehicle operator that the windshield wiping system is being operated in the intermittent mode.

As shown in FIG. 2, operation begins with initialization at step 50. During initialization, appropriate memory locations and flags are cleared, variables are set to predetermined values, output ports are reset to normal state, the gain for the I/V converter 18 shown in FIG. 1 is preset, and the like. At step 52, autoranging of amplification is performed by the microcontroller.

Figure 3:
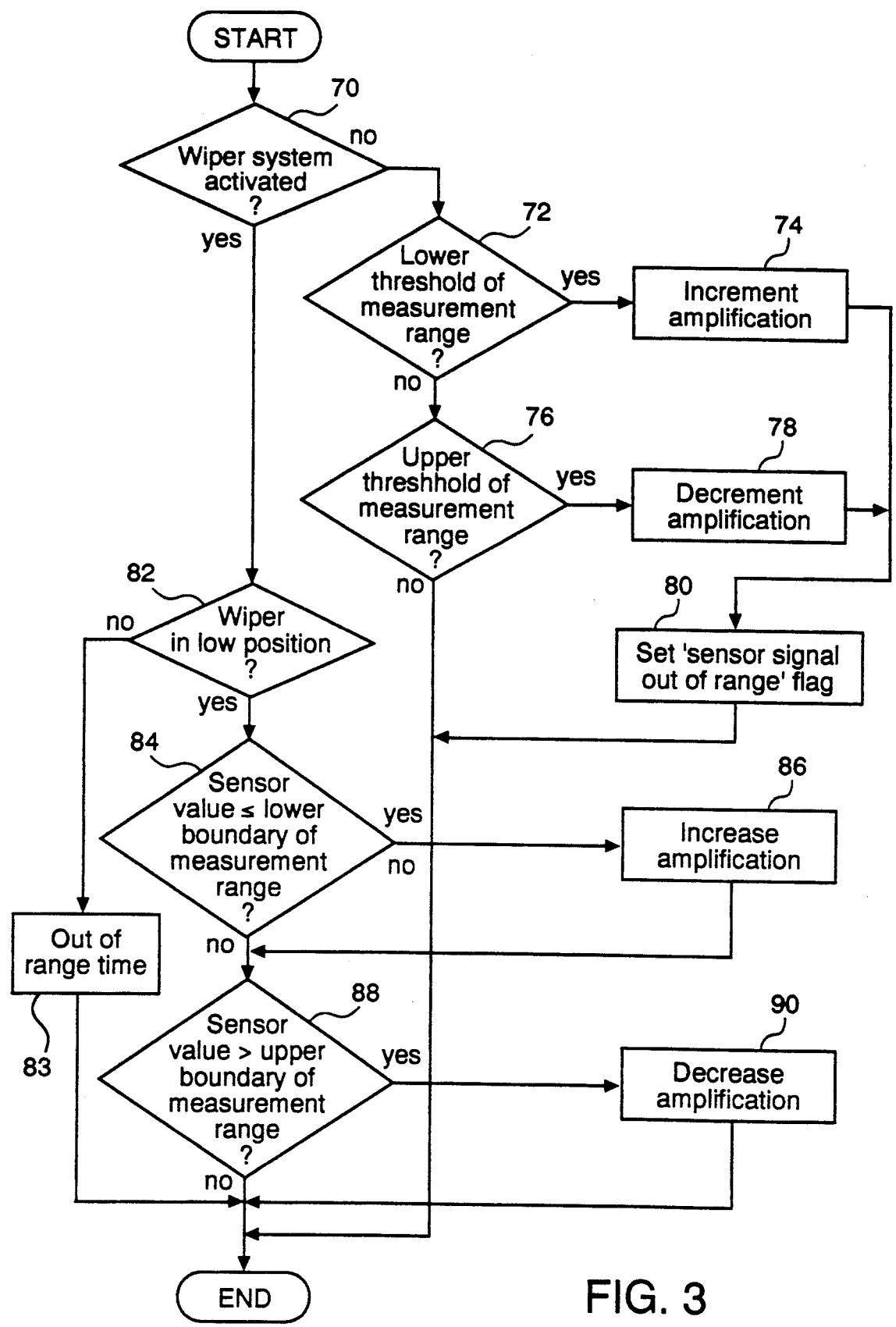
FIG. 3 is a flow chart detailing the autoranging step shown in FIG. 2.
Figure 4:
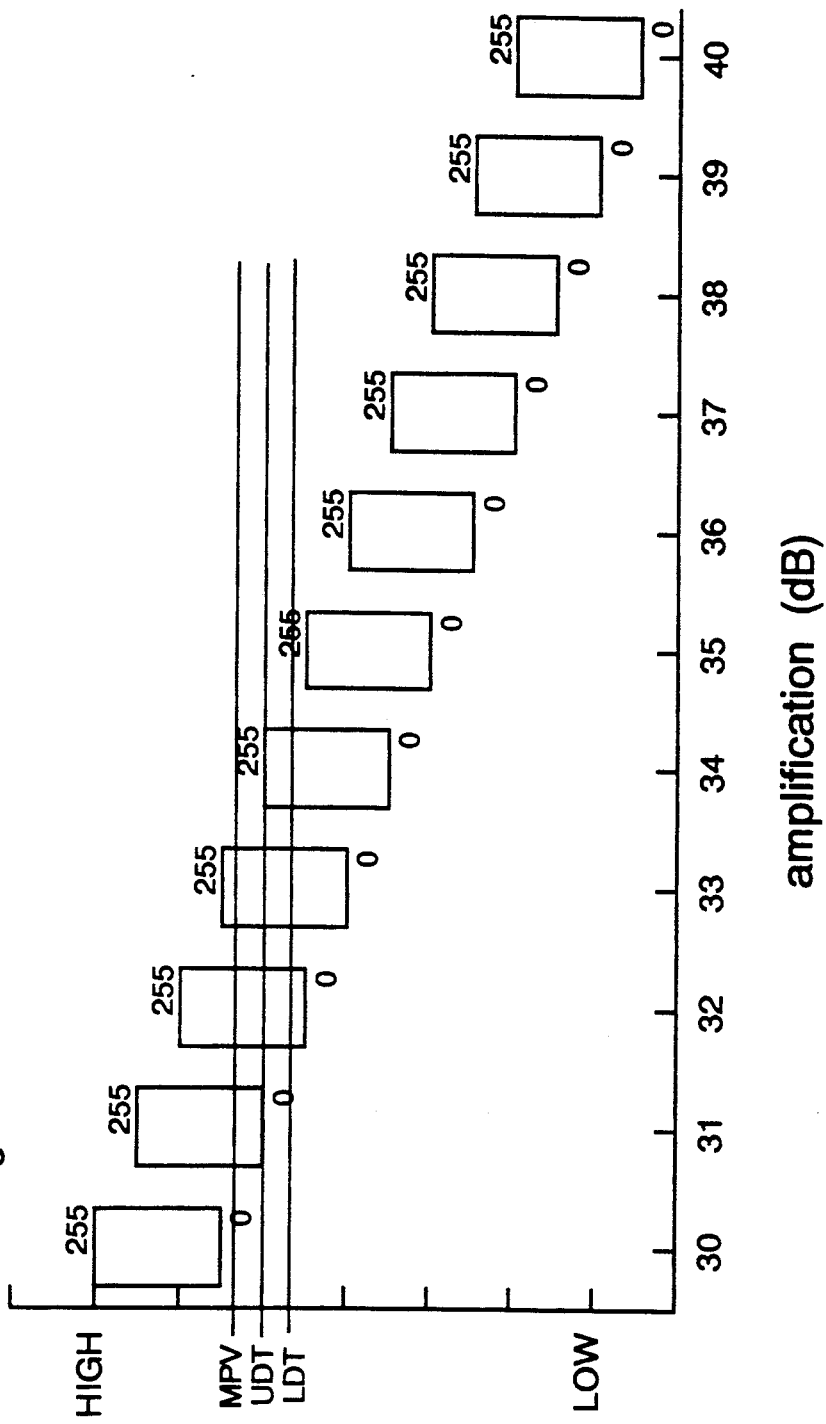
FIG. 4 is a graphical representation of the relationship between data range selection and amplification, illustrating the shifting 256-bit data range window.

With reference now to FIGS. 3 and 4, there is shown a flow chart illustrating the steps for autoranging of amplification as utilized by the present invention, and a graphical illustration of the data range selection utilized during autoranging of the amplification, respectively. In the preferred embodiment, either the emitted light or the received light can be amplified. Most preferably, the transmitting current of the LEDs is adjusted first during autoranging to a maximum value of 15 dB. If further amplification is required, the received light can then be amplified in about 10 dB increments. The transmitted light is adjusted first due to signal-to-noise ratio considerations, since amplification of the received light results in amplification of noise. The amplification circuitry is part of the I/V converter 18 shown in FIG. 1, and includes a two-stage inverting amplifier.

Referring now to FIG. 4, there is illustrated the relationship between data range and amplification. Considerable dynamic range is required by the apparatus to compensate for the effects of different windshield types, dirt, salt, different rain intensities, and the like. The sensor value provided to the microcontroller is monitored and the gain is accordingly adjusted so as to keep the data range at a readable level. As shown, lower amplification values are associated with windshields with high transmission and higher amplification values are associated with windshields with low transmission. Regardless of the moisture/dirt condition on the surface of the windshield, the data range is represented by a 1-byte window (256 values) that shifts depending on the amplification value. The preferred amplification level is about 33 dB, wherein the associated window includes the maximum possible value (MPV) threshold, the upper dirt threshold (UDT) and the lower dirt threshold (LDT). The MPV represents the signal value associated with a clean and dry windshield. The UDT and LDT are functions of the amplification level and of the MPV for a clean windshield. The UDT is about 50-60 values below the MPV and the LDT is about 100-120 values below the MPV. In the preferred embodiment, during autoranging the gain is adjusted to an amplification level which includes all three thresholds. The normal amplification level is about 33 db, with the MPV having a window value of about 230, the UDT having a window value of about 180 and the LDT having a window value of about 130. Although the window values of the MPV, UDT and LDT vary based on amplification, they still represent the same moisture/dirt condition on the windshield. For example, the MPV is about 150 for an amplification of 32 dB, and 230 for an amplification of 33 dB, but the MPV still represents the sensor value for the driest and cleanest windshield.

At step 70, the microcontroller determines whether or not the windshield wiper system is activated. The microcontroller makes this determination based on the signal WA from the wiper motor. Preferably, the wiper motor includes an internal switch which is actuated shortly after the motor is energized and the wiper blades leave the resting position. When the switch is actuated, the wiper-active signal is provided to the microcontroller. While the wiper motor is deactivated, at step 72 the microcontroller determines whether the sensor value is below the lower threshold of measurement range (LTMR ≈ 30 values) of the data window. If the sensor value is below the LTMR, the amplification is adjusted at step 74 by a predetermined increment, such as 1 dB. If the sensor value is above the LTMR, the microprocessor determines at step 76 whether the signal value has exceeded the upper threshold of measurement range (UTMR ≈ 240 values) of the data window. If the sensor value has exceeded the UTMR, then at step 78 the amplification is adjusted by a predetermined decrement, such as 1 dB. After either a unit increment or a unit decrement at step 74 or 78, respectively, at step 80 the sensor signal out-of-range flag is set, forcing the windshield wipers to wipe the windshield, so as to clear the moisture. Every time a wiper blade passes over the sensor active area for the last time during the wipe, a new HPV is determined, as described in greater detail below.

With continuing reference to FIG. 3, if the wiper motor is activated (i.e. a wipe cycle is occurring) at step 70, control flow jumps to step 82, wherein the microcontroller determines whether or not the wipers are in the low, or resting, position. If the wipers are not in the low position, the signal value is observed at step 83 to determine if it is out of measurement range and how long it has been so. After that the autoranging procedure is exited, with control flow returning to block 54 of FIG. 2. If, however, the wiper motor has been activated and the wipers are again in the low position, the microcontroller checks the information from the last wiping cycle (step 83) and determines whether the sensor value was within the data window. More specifically, at step 84 the microcontroller determines whether the signal value was below the lower boundary (i.e. LB=1, sensor value=0) of the data window. If so, at step 86 the amplification is increased by an amount proportional to the total time during the wipe cycle that the sensor value was out of the data window. If not, at step 88 the microcontroller determines whether the sensor value had exceeded the upper boundary (i.e. UB=254, sensor value=255) of the data window and, if so, decreases the amplification at step 90 by an amount proportional to the total time during the wipe cycle that the sensor value was out of the data window.

As shown in FIG. 2, after autoranging of the amplification is complete, at step 54 the microcontroller performs a rain pattern recognition procedure. The magnitude of the sensor active area as compared to the total windshield area becomes significant when the rain is falling slowly and in a pattern of widely scattered drops. In this case, inference wipes of the wiper blades are made independent of the switch-on threshold, so as to assure consistent wiping intervals, as described in greater detail below.

Figure 5:
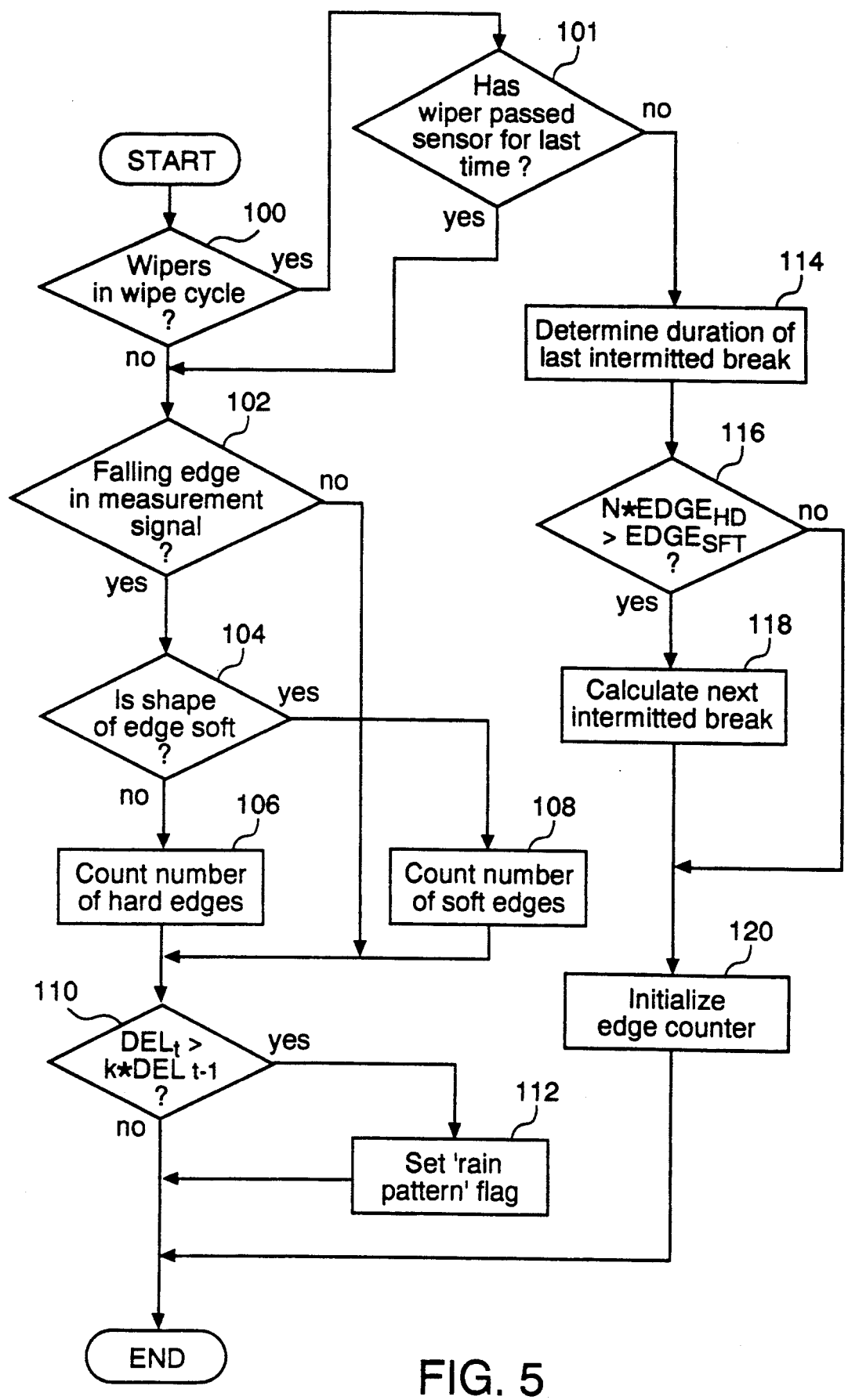
FIG. 5 is a flow chart detailing the single drop recognition step of the present invention shown in FIG. 2.

Referring now to FIG. 5, there is shown a flow chart illustrating the steps of the method for recognition of a single rain drop pattern of the present invention. FIGS. 6a-6b are graphical illustrations of the sensor value during single rain drop recognition and the wiper active signal representing activation of the wiping system, respectively. In the preferred embodiment, the wiping system is controlled according to the single rain drop recognition procedure only during operation of the wiping system in intermittent mode. The sensor value varies, i.e. increases or decreases resulting in an "edge", as the moisture level on the sensor active area varies. Depending on the type of moisture, the shape of the sensor value edge is either "hard" or "soft". During the time delay between consecutive wipes, the microcontroller counts both types of edges. Generally, if the number of soft edges counted during a delay period does not overwhelmingly exceed the number of hard edges counted during the same period, a single drop rain pattern is recognized.

As shown in FIG. 5, at step 100 the microcontroller determines whether the wipers are currently in a wipe cycle wiping the windshield, or whether the wipers are in the resting position during an intermittent delay period. If the wiper is in a wiping cycle the microcontroller checks at step 101 if the wiper blade has passed the sensor active area for the second time. If the wiping system is in an intermittent delay period, or if the wiper is on the way to the rest position, the microcontroller analyzes the sensor value at step 102 to determine the presence of a falling edge in the sensor value. If a falling edge is present, a rain drop has fallen on the sensor active area, and at step 104 the microcontroller determines the shape of the edge. With the preferred embodiment, a hard edge represents about a 4 digit decrease in the sensor value, and a soft edge represents about a 2-3 digit decrease in the sensor value, typical of drizzle-like rain patterns. A hard edge due to a rain drop is shown at point "A" on FIG. 6a.

Depending on the shape of the edge, the microcontroller counts the number of hard edges ($EDGE_{HD}$) or soft edges ($EDGE_{SFT}$) at steps 106 or 108, respectively. Thus, since the sensor value includes a single hard edge at point "A" of FIG. 6a, $EDGE_{HD}=1$ and $EDGE_{SFT}=0$. At step 110, the microcontroller compares the present intermittent delay period ($DEL_t$) with the previous delay period ($DEL_{t-1}$) as follows:

$$DEL_t > k * DEL_{t-1} \qquad (1)$$

wherein K is a constant, such as 1. During the first pass through the routine, the test fails since DELt and DELt-1 still have their initialized values of "0", and control flow returns to FIG. 2.

Since the falling edge at point "A" in FIG. 6a lowered the sensor value to a value below the switch on threshold for the intermittent mode of operation $TIM_{OFF}$, the wiper motor is energized after expiration of the delay period, such as time t=1 of FIG. 6b. The threshold for the intermittent mode is calculated from the HPV. As the wiper blades leave the resting position and wipe the windshield, water is pushed over the sensor active area, resulting in a first sharp decrease in the sensor signal, shown generally at point "B" on FIG. 6a. As the wiper blades return toward the resting position, water is once again pushed over the sensor active area, resulting in a second sharp decrease in the sensor signal, shown generally at point "C" on FIG. 6a. Once the wipers pass the active area on the return wipe, the sensor active area is substantially dry, resulting in a sharp increase in the sensor signal to a point above the switch on threshold. At point t=2 on FIG. 6b, the wiper motor is deenergized for a duration equivalent to the delay period.

With reference once again to FIG. 5, when the single drop procedure is executed again, control flow will skip to step 114, since the condition at step 100 will be satisfied since the motor will have been activated during intermittent operation and the wiper has not reached the sensor for the second time. At step 114, the microcontroller determines the duration of the previous delay period between the consecutive wipes of the windshield. At step 116, the microcontroller tests the following inequality, the results of which actually indicate the existence of a single rain drop pattern:

$$n * EDGE_{HD} > EDGE_{SFT} \qquad (2)$$

wherein e.g. n=4. If this condition is not satisfied, the next wipe cycle will be initialized when moisture is detected. At step 120, the microcontroller initializes the edge counters.

If the condition at step 116 is satisfied, at step 118 the microcontroller calculates a new delay period between consecutive wipes based on the old delay period. However, if detected moisture makes an earlier wipe appropriate, this is executed. As can be seen from FIGS. 6a and 6b, it should be noted that between times t=2 and t=3, the sensor value remained above $T_{ON}$, indicating no rain drops fell on the sensor active area. In step 110, as shown in FIG. 5, the current delay time is checked. If the delay time which is calculated in step 118 is finished, the microcontroller sets the rain pattern flag (step 112) which initializes the wipe cycle. At time t=3 on FIG. 6b, the motor is once again energized by the microcontroller and the windshield is wiped. As the wiper blades leave the resting position and wipe the windshield, water is pushed over the sensor active area, resulting in a sharp decrease in the sensor signal, shown generally at point "D" on FIG. 6a. As the wiper blades return toward the resting position, water is once again pushed over the sensor active area, resulting in another sharp decrease in the sensor signal, shown generally at point "E" on FIG. 6a. After the sensor signal returns to a point above TIMOFF at point t=4 on FIG. 6b the wiper motor is deenergized in the resting position.

Referring once again to FIG. 2, at step 56 the microprocessor executes a sensitivity control procedure. In the preferred embodiment, when dirt, salt, and the like, are present on the windshield, the switch-on threshold and switch-off threshold are reduced so as to delay activation of the windshield wiping system and allow moisture to collect on the windshield. With the extra moisture on the windshield, the wiper blades will have a more effective cleansing action and dirt streaks across the windshield will be reduced. Generally, dirt is detected by comparing the HPV to the upper dirt threshold and the lower dirt threshold. If the HPV falls below either of these thresholds, the sensitivity is reduced correspondingly.

Figure 7:
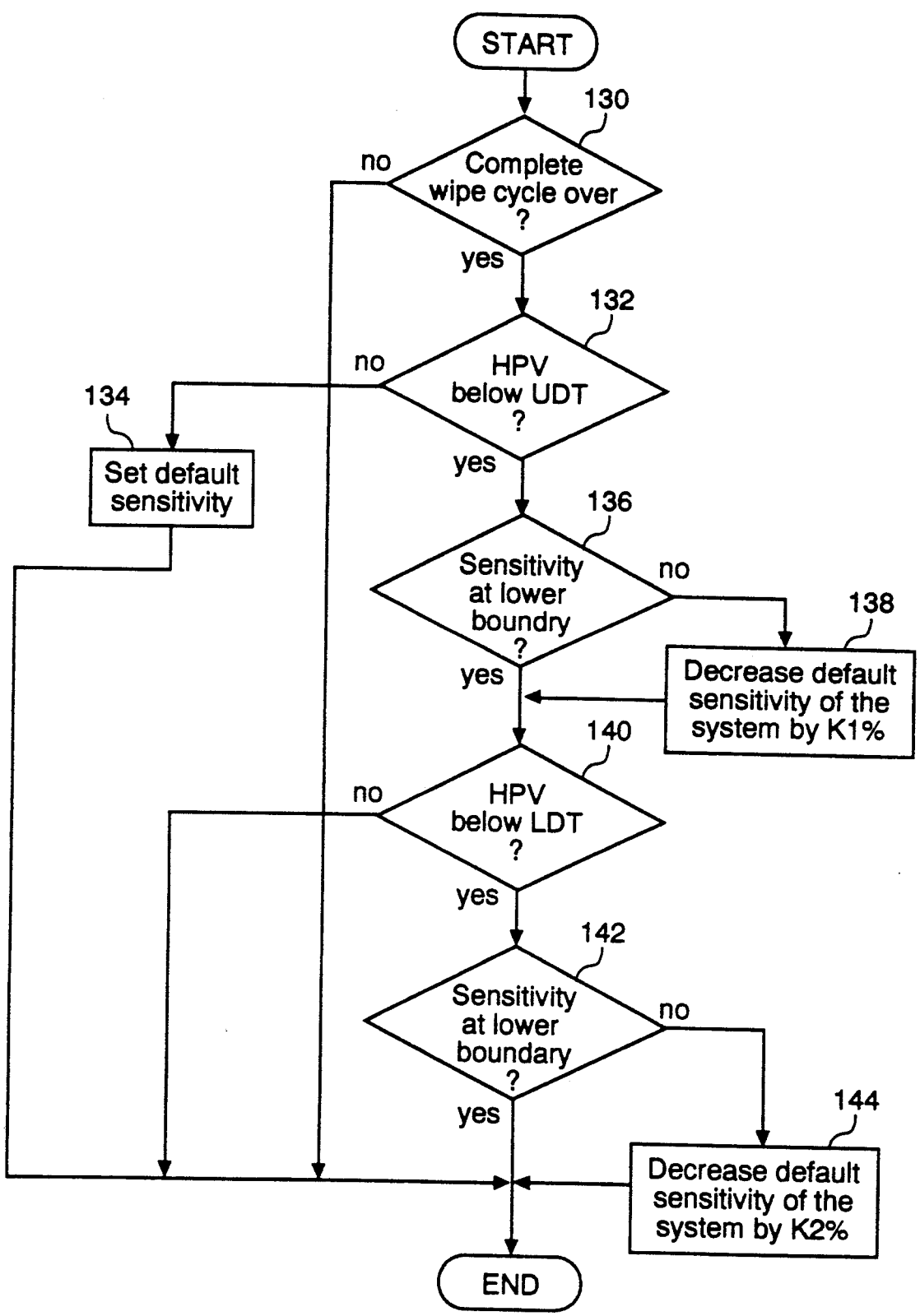
FIG. 7 is a flow chart detailing the sensitivity control step shown in FIG. 2.

With reference now to FIG. 7, there is shown a flow chart illustrating the steps for dirt streak dependent sensitivity control for use with the present invention. Initiation of the sensitivity control procedure is deferred until the wiping system is deactivated after completion of a wipe cycle, as determined at step 130. At step 132, the microcontroller detects the presence of dirt on the windshield by comparing the present HPV to the upper dirt threshold. This comparison takes place after the wiper has passed the sensor for the second time. If the HPV is above the UDT, at step 134 the microcontroller sets the sensitivity level to a predetermined default level and control flow returns to step 58 of FIG. 2. If the condition at step 132 is satisfied and the HPV is below the upper dirt threshold, the microcontroller determines whether or not the sensitivity of the sensor is at its lower boundary, since it is not desirable to further decrease the sensitivity further below the lower boundary. If not, the microcontroller decreases the default sensitivity level of the system by about K1% of the HPV, wherein K1%=2%, for example. If the sensitivity of the system is at the lower boundary, at step 140 the microcontroller determines whether the present HPV is below the lower dirt threshold (LDT). If the HPV is above the LDT, the sensitivity procedure is exited. If the HPV is below the LDT, at step 142 the microcontroller determines whether or not the system sensitivity is at the lower boundary. Depending on the result, the sensitivity may be decreased by about k2% of the HPV at step 144, wherein k2%=5%, for example.

As shown in FIG. 2, after performing the sensitivity control procedure at step 56, the microcontroller executes the start wiper procedure at step 58. Generally, when the moisture ratio measurement value falls below the switch-on threshold, the windshield wipers are activated. With additional reference to FIG. 8, there is shown a flow chart detailing the steps for determining whether or not to activate the windshield wipers from the low, or resting, position. At step 150, the microcontroller makes a moisture ratio measurement value. As previously discussed, the moisture ratio measurement value is calculated from the current sensor value and the last determined HPV. At step 152, a comparison is performed by the microcontroller to determine whether the moisture ratio is below the predetermined noise level (e.g. 98%) prior to updating the value of the switch on threshold at step 156 according to the following equation:

$$T_{ON} = T_{DEF} + K * \int_{T_S}^{t} (N - MRV) dt \qquad (3)$$

wherein N represents a predetermined noise level and $T_{DEF}$ represents a default switch on threshold. Equation (3) represents an integration over time proportional to the quantity of moisture present.

Figure 8:
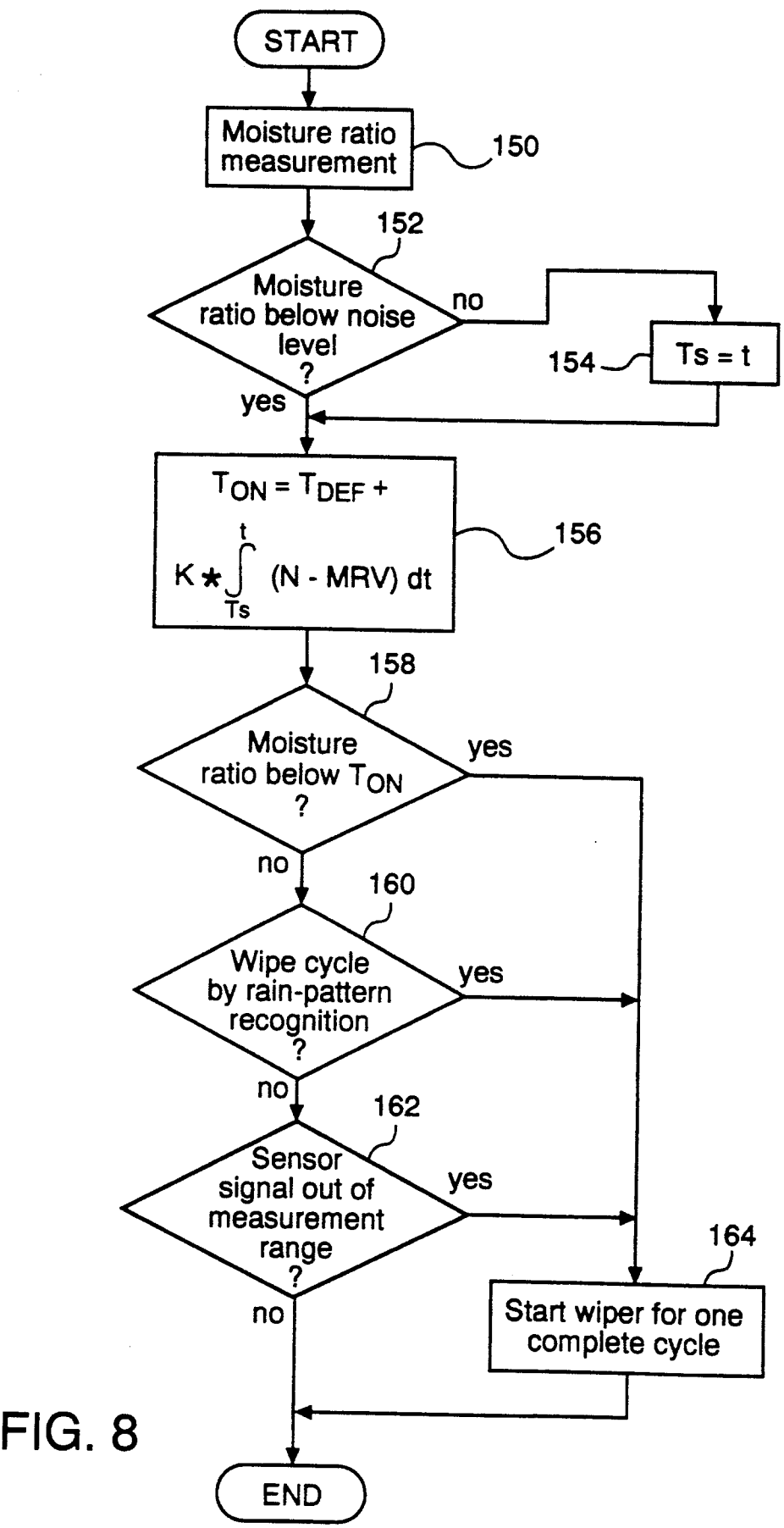
FIG. 8 is a flow chart detailing the start wiper step shown in FIG. 2.

As shown in FIG. 8, if the moisture ratio is not below the predetermined noise level, the switch on threshold does not need to be adjusted from the default value. As a result, at step 154, the variable Ts, which represents the time at which the MRV dropped below the noise level, is set to the value of t, which represents the current time, such that the integral term of equation (3) above is equal to zero and the switch on threshold remains at the default level, $T_{ON}=T_{DEF}$. If, however, the moisture ratio is below the noise level, indicating the presence of moisture, the switch-on threshold is adjusted.

With continuing reference to FIG. 8, at step 158 the microcontroller determines whether the moisture ratio is below the adjusted switch-on threshold determined at step 156. Assuming the moisture remains on the sensor active area, the switch on threshold will eventually exceed the MRV. When it does, control flow jumps to step 164, and the windshield wipers are activated for one complete cycle. If the moisture ratio is not below the adjusted switch-on threshold, at step 160 the microcontroller determines whether a wipe cycle should be initiated based on a single drop rain pattern, previously discussed with reference to FIGS. 5 and 6. If the observed rain pattern indicates a wipe cycle is necessary at step 160, control flow jumps to step 164 and the wipers are activated. If not, the sensor signal is analyzed at step 162 to see if it is out of measurement range (i.e. 0 or 255). If the sensor signal is out of measurement range, the wipers are activated for one complete cycle at step 164, which in turn triggers determination of a new HPV and accordingly new thresholds. If the sensor signal level is acceptable, control flow returns to step 60 of FIG. 2.

Referring once again to FIG. 2, if the windshield wipers are activated as determined at step 60, at step 62 the microcontroller determines the new HPV. As previously discussed, the HPV reflects the maximum sensor value for a dry, or clean, windshield. In the preferred embodiment, the HPV is measured after the wiper blades pass over the sensor active area for the last time during a wipe cycle. It is at this time that the area of the windshield monitored by the sensor is the driest, or the cleanest, for the existing rain/dirt condition. Thus, a dry and clean windshield may have a maximum sensor value of 200, whereas a dry and dirty windshield may have a maximum sensor value of only 150. If the HPV is not periodically adjusted, the switch on and switch off thresholds, which are derived from the HPV, would prevent proper operation. For example, assume the switch on threshold is set at a value of 95% of the HPV. For an HPV of 200, the switch on threshold is 190. However, the maximum sensor value for a dry and dirty windshield may be only 150. Since the sensor value would be always below the switch on threshold, continuous wiping would result. Periodic determination of HPV allows the microcontroller to accurately ascertain at which sensor values the wiper motor should be energized.

Figure 9:
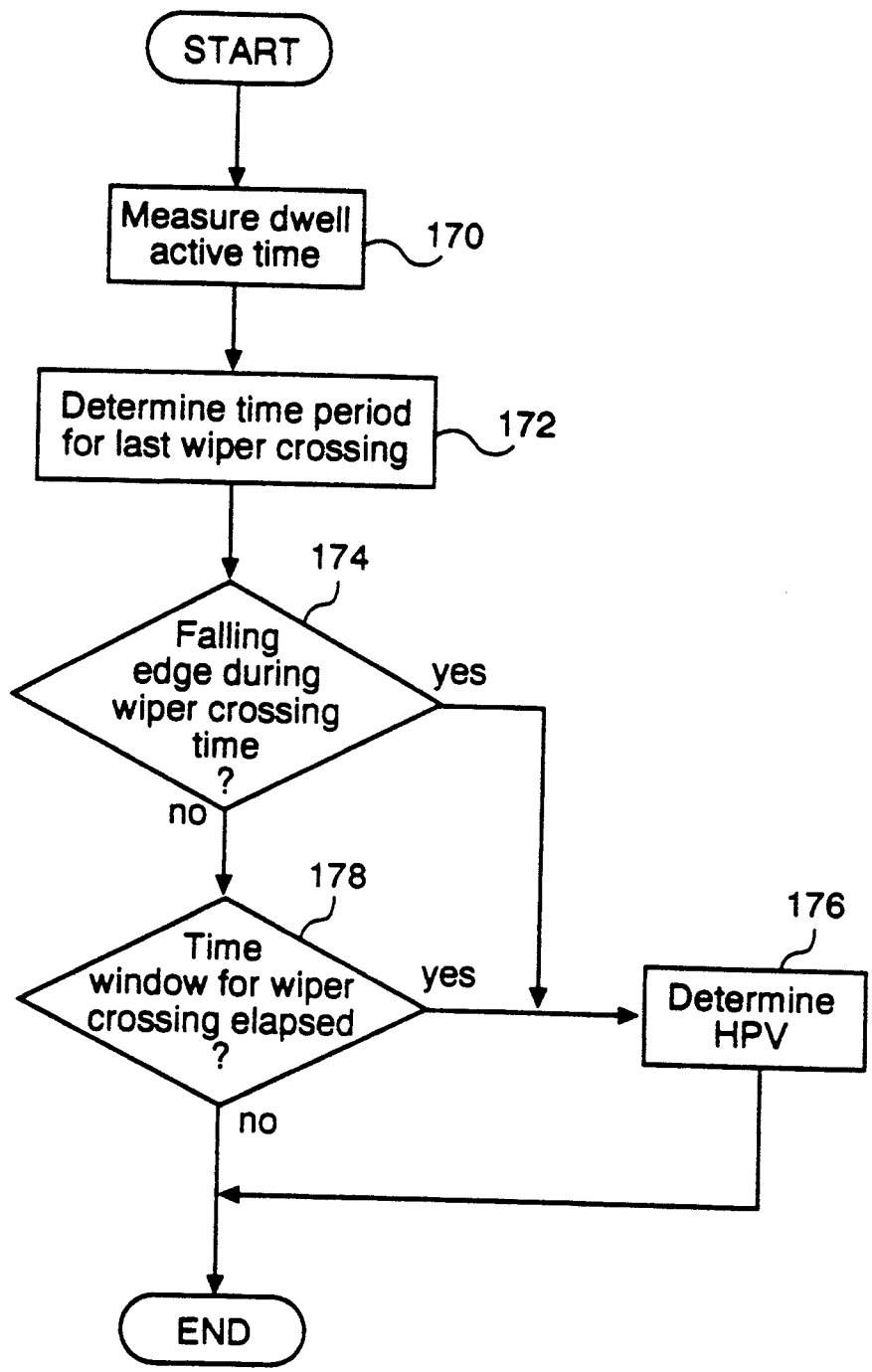
FIG. 9 is a flow chart detailing the determined hundred percent value (HPV) step of the present invention shown in FIG. 2.

Referring now to FIG. 9, there is shown a flow chart detailing the steps for determination of the HPV of the present invention. FIGS. 10a and 10b are graphical illustrations of the typical sensor signal during determination of the HPV and the wiper activation signal, respectively. As shown in FIG. 9, at step 170, the microcontroller measures the dwell active time, which represents the duration of one complete wipe cycle, i.e. two passes of a wiper blade over the sensor active area. This time can vary due to the amount of water or dirt on the windshield, the battery voltage, vehicle speed and also due to aging of the wiper blades, the wiper motor and the like. The sensor signal trace of FIG. 10a is shown for a majority of a complete wipe cycle. Point "F" represents the point in time just after a wiper blade has pushed water over the active area and passed over the sensor active area. At this point, the sensor active area is dry, resulting in a sharp increase in the sensor signal to about point "G".

At step 172, the microcontroller determines the time at which the wiper blades should have crossed the sensor active area for the last time during a wipe cycle, i.e. on the return wipe toward the resting position. This time is shown at about time $t=T_C$ on FIG. 10a. This determination is possible since the microcontroller knows when the motor was energized and knows the duration of the last complete wipe cycle (run time of the wiper active signal). When $T_C$ is determined, the microprocessor expands that time to a time window having a lower band at about time $t=T_C-30$ mS and an upper band at about time $t=T_C+30$ mS. At step 174, the microcontroller analyzes the sensor signal for the presence of a sharp decrease during that time window. This sharp decrease, such as that shown at point "H" on FIG. 10a, indicates water being pushed over the sensor active area by the wiper blades on their return to the resting position.

With continuing reference to FIGS. 10a-10b, if a sharp decrease was detected, at step 176 the microprocessor searches for a new HPV. To determine the new HPV, the microcontroller monitors the sensor value after detection of the sharp decrease for a new maximum value. As best shown in FIG. 10a, the sensor value increases sharply after the wiper blades pass over the sensor active area and attains a maximum value at about time $t=T_{MAX}$. The sensor value thereafter decreases due to, for example, the presence of more rain on the sensor active area.

As shown in FIG. 10a, the sensor value will continue to decrease as the amount of moisture or dirt on the windshield increases. The wiper motor is deenergized based on the sensor value and the appropriate threshold. Thus, when the windshield wiping system is operating in continuous mode (i.e. two consecutive wipe cycles in a row), the wiper system will continue to function in the continuous mode as long as the sensor signal drops below $TCM_{OFF}$, which has a value of about 97% of HPV, for example. If the sensor value remains above $TCM_{OFF}$, the wiper motor will be deenergized. This wiping strategy helps to insure minimize erratic wiper behavior, since the windshield condition has to be rather dry for the sensor value to exceed the higher threshold. Similarly, when the windshield wiping system is operating in intermittent mode, the wiper system will continue to function in the intermittent mode as long as the sensor signal drops below $TIM_{OFF}$, which has a value of about 95% of HPV, for example. If the sensor value remains above $TIM_{OFF}$, the wiper motor will be deenergized since the system is not operating in continuous mode, such as at time $t=t_{OFF}$ on FIG. 10b. The wiper motor will not be energized again until the sensor value drops below the $T_{ON}$ threshold due to moisture on the active area, such as at time $t=t_{ON}$. If no falling edge was detected at step 174, and the time window during which the wipers should have crossed the active area expires, at step 178 control flow returns to step 176 and a new HPV is determined, as previously discussed.

As shown in FIG. 2, once the new HPV is determined at step 62, the microprocessor executes a stop wiper procedure to determine whether or not to deactivate the windshield wiping system. Generally, when the moisture ratio is above the switch-off threshold after a complete wipe cycle, the wipers are deactivated.

Figure 11:
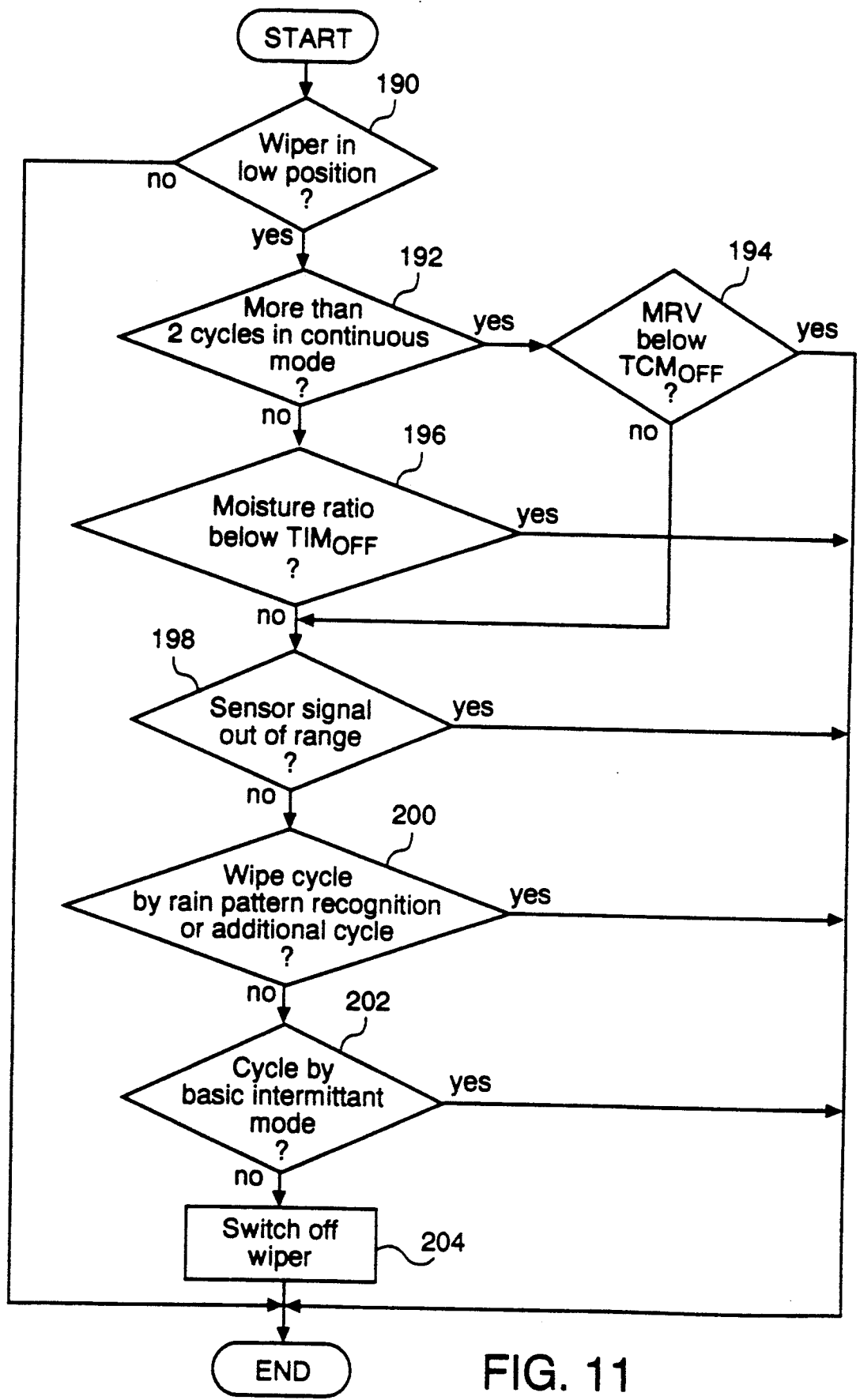
FIG. 11 is a flow chart detailing the stop wiper step shown in FIG. 2.

Referring now to FIG. 11, there is shown a flow chart detailing the steps for determining whether to stop the wiper in the low position. When the windshield wiping system is in the low position as determined at step 190, the microcontroller determines at step 192 whether the windshield wiping system has been activated for more than two cycles in the continuous mode. If the condition is satisfied, at step 194 the microcontroller compares the moisture ratio measurement value (MRV) to the continuous mode switch-off threshold ($TCM_{OFF}$). If the MRV is below $TCM_{OFF}$, the stop wiper procedure is exited and control flow returns to the main loop shown in FIG. 2 wherein steps 52-62 are repeated as described in greater detail above. Independently of the switch on threshold, the switch off threshold increases when the wiper is operating in continuous mode e.g. $TIM_{OFF}=96\% * HPV$ and $TCM_{OFF}=97\% *$ HPV. For moisture ratio values above the switch off threshold, control flow jumps to step 198, described in greater detail below.

Figure 10:
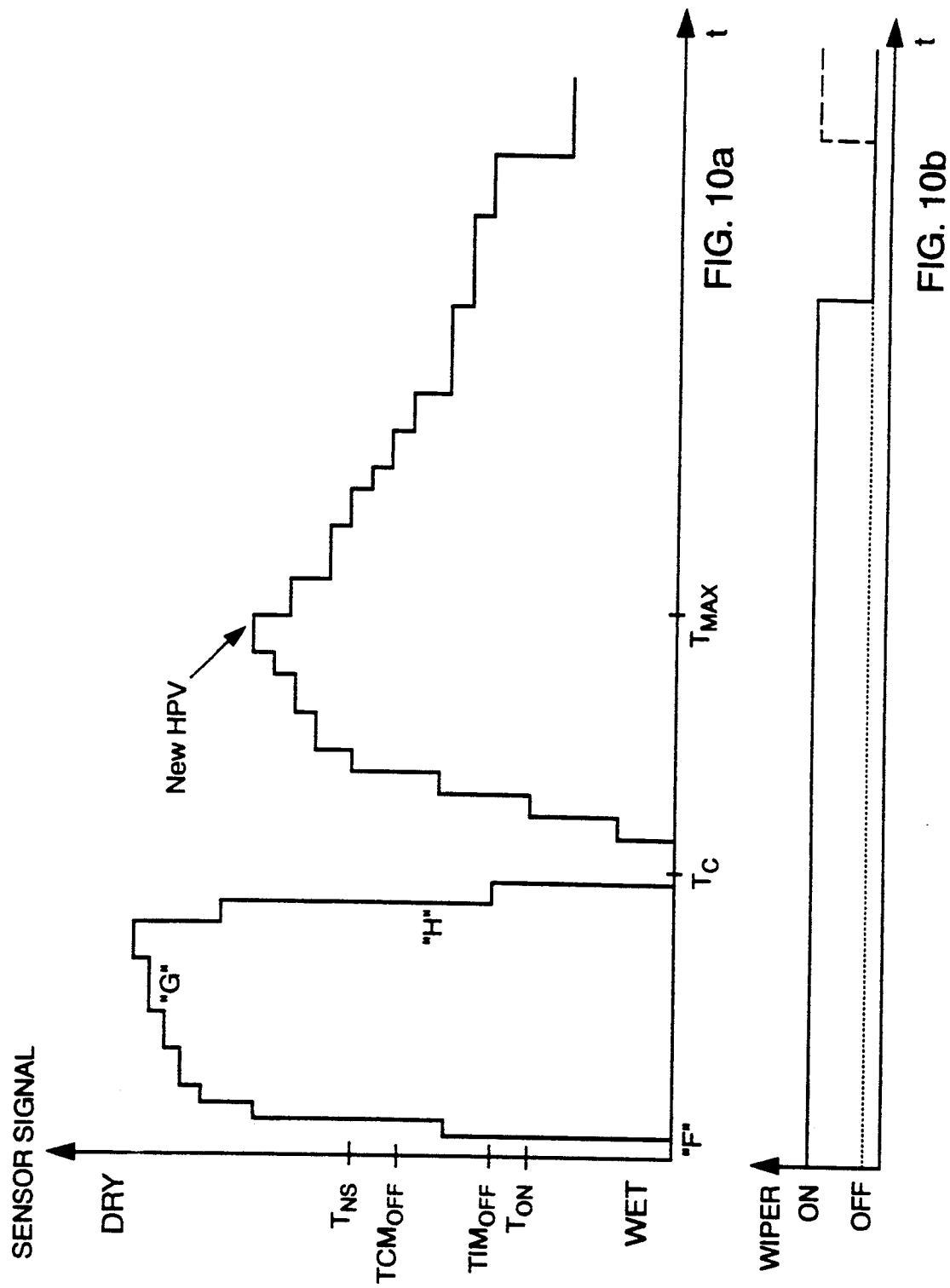
FIGS. 10a–10b are a graphical representation of the sensor signal trace during determination of the HPV, and the associated wiper activation signal, respectively.

With continuing reference to FIG. 10, if the condition tested at step 192 was not satisfied, at step 196 the microcontroller determines whether the moisture ratio value is below the intermittent mode switch-off threshold (TIM$_{OFF}$). At steps 198, 200 and 202, the microprocessor analyzes the sensor signal for out-of-range values, determines whether the current rain pattern requires continued activation of the wiper system and determines whether the wiper should be cycled according to the basic intermittent mode, respectively. If any of these conditions are satisfied, the stop wiper procedure is exited and control flow returns to the main loop of FIG. 2, wherein steps 52-62 are repeated as described above. If these conditions are not satisfied, the microcontroller deactivates the wiper system at step 204 and control flow is returned to the main loop as shown in FIG. 2.

It is to be understood, of course, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. A method of controlling a vehicular windshield wiping system, the wiping system including a sensor mounted to the windshield for monitoring a portion of the windshield and generating a sensor signal, the method comprising the steps of:
    detecting the presence of at least one falling edge in the sensor signal, the at least one falling edge indicating the presence of moisture on the monitored portion of the windshield;
    identifying the shape of the at least one falling edge, the wiping system detecting at least one rain pattern based on the shape and number of falling edges in the sensor signal during a predetermined period of time; and
    controlling the windshield wiping system based on the identified rain pattern.

2. The method of claim 1 wherein the step of identifying the shape further comprises the step of identifying hard falling edges, each hard falling edge representing a single drop of moisture on the monitored portion of the windshield.

3. The method of claim 2 wherein the step of identifying the shape further comprises the step of identifying soft falling edges, a soft falling edge indicating a drizzle-like moisture pattern on the monitored portion of the windshield.

4. The method of claim 3 wherein the step of controlling the windshield wiping system further comprises the step of determining a delay period between consecutive wipes of the windshield if the number of hard falling edges substantially exceeds the number of soft falling edges during the predetermined period of time.

5. The method of claim 4 further comprising the step of operating the wiping system in an intermittent mode wherein there is a variable delay period between consecutive wipes of the windshield.

6. A method of controlling a vehicular windshield wiping system including at least one wiper blade, and a sensor mounted to the windshield for monitoring a portion of the windshield, the sensor generating a signal having a value which varies as moisture or dirt or both collect on the monitored portion, the wiping system being activated when the sensor value crosses a predetermined switch-on threshold and deactivated when the sensor value is above a predetermined switch off threshold, the method comprising the steps of:
    determining a first sensor value when the monitored portion is substantially free of moisture, the first sensor value being less than a maximum possible sensor value due to the presence of dirt on the monitored portion, thereby allowing the windshield wiping system to distinguish between the presence of moisture and dirt on the monitored portion based on the first sensor value;
    modifying the predetermined switch-on and switch-off thresholds based on the first sensor value; and
    controlling the windshield wiping system based on the modified thresholds, thereby insuring the wiping system is activated due only to the presence of moisture on the monitored portion.

7. The method of claim 6 further comprising the step of activating the wiping system for at least one wipe cycle when the sensor value drops below the predetermined switch-on threshold, the at least one wiper blade leaving a resting position and wiping the windshield, passing over the monitored portion of the windshield at least once.

8. The method of claim 7 wherein the first sensor value is determined after the at least one wiper blade passes over the monitored portion of the windshield for the last time during the wipe cycle, the monitored portion being substantially dry after the blade passes.

9. A method of controlling a vehicular windshield wiping system including at least one wiper blade, and a sensor mounted to the windshield for monitoring a portion of the windshield, the sensor generating a signal having a value which varies as moisture or dirt or both collect on the monitored portion, the wiping system being activated when the sensor value crosses a predetermined switch-on threshold, and deactivated when the sensor value is above a predetermined switch-off threshold, the method comprising the steps of:
    activating the wiping system for at least one wipe cycle when the sensor value drops below the predetermined switch-on threshold, the at least one wiper blade leaving a resting position and wiping the windshield, passing over the monitored portion of the windshield at least once;
    determining a first sensor value after the at least one wiper blade passes over the monitored portion of the windshield for the last time during the wipe cycle, the monitored portion being substantially free of moisture, the first sensor value being less than a maximum possible sensor value due to the presence of dirt on the monitored portion so as to allow the windshield wiping system to distinguish between the presence of moisture and dirt on the monitored portion;
    modifying the predetermined switch-on and switch-off thresholds based on the first sensor value; and
    controlling the windshield wiping system based on the modified thresholds, thereby insuring the wiping system is activated due only to the presence of moisture on the monitored portion.

10. A method of controlling a vehicular windshield wiping system, the wiping system including at least one windshield wiper and a sensor mounted to the windshield for monitoring a portion of the windshield wiped by the wiper during each wipe cycle, the sensor generating a sensor signal having a value which varies as a coating collects on the monitored portion of the windshield, the method comprising the steps of:

defining a connection threshold based on the sensor signal, for starting operation of the windshield wiping system;

defining a first disconnection threshold based on the sensor signal, for ceasing operation of the windshield wiping system in a first mode of operation; and defining a second disconnection threshold based on the sensor signal, for ceasing operation of the windshield wiping system in a second mode of operation.

11. The method of claim 10 wherein the first mode of operation is an intermittent mode of operation in which successive wipes of the wiper across the windshield are separated by a predetermined time delay, and wherein the second mode of operation is a continuous mode of operation in which successive wipes of the wiper across the windshield are not separated by a predetermined time delay.

12. The method of claim wherein the disconnection threshold for the intermittent wiping mode has a value which exceeds the value of the connection threshold.

13. The method of claim 11 wherein the disconnection threshold for the continuous wiping mode has a value which exceeds the value of the disconnection threshold for the intermittent wiping mode.

14. The method of claim 11 further comprising the step of maintaining operation of the windshield wiping system after operation in the continuous mode even if the sensor value exceeds the disconnection threshold for the continuous mode of operation, such that the wiping system operates for at least one additional wiping cycle.

15. The method of claim 10 further comprising the step of defining an interference threshold based on the sensor signal, the interference threshold having a predetermined value for indicating the presence of a coating on the windshield with substantial certainty.

16. The method of claim 15 wherein the connection threshold is a variable quantity, and further comprising the step of incrementing the connection threshold in predetermined intervals from an original value when the sensor signal has a value which falls below the interference threshold.

17. The method of claim 16 wherein the step of incrementing includes incrementing the connection threshold at a rate which varies based on the period of time during which the sensor signal remains below the interference threshold but above the connection threshold.

18. The method of claim 17 further comprising the step of decrementing the connection threshold to the original value when the sensor signal, within a specific period of time after falling below the interference threshold, again exceeds the interference threshold.

19. The method of claim 10 wherein the connection threshold has a value of about 93% of the sensor signal value associated with an optimally clean windshield.

20. The method of claim 10 wherein the first disconnection threshold has a value of about 95% of the sensor signal value associated with an optimally clean windshield.

21. The method of claim 10 wherein the second disconnection threshold has a value of about 97% of the sensor signal value associated with an optimally clean windshield.

22. The method of claim 15 wherein the interference threshold has value of about 98% of the sensor signal value associated with an optimally clean windshield.

23. A method of controlling a vehicular windshield wiping system including a motor, at least one windshield wiper and an optoelectronic sensor mounted to the windshield for monitoring a portion of the windshield wiped by the wiper during each wipe cycle, the sensor including infrared beam transmitters for emitting beams and infrared beam receivers for receiving the emitted beams, the emitted beams being modified based on the coating on the windshield, the sensor generating a signal having a value which varies as a coating collects on the monitored portion of the windshield, the method comprising the steps of:

establishing a data window having a first plurality of values based on the sensor signal;

establishing a measurement range within the data window, the measurement range having a second plurality of values defined by an upper threshold and a lower threshold; and modifying the amplification of the beams emitted by the beam transmitters if the sensor signal has a value which is outside of the measurement range.

24. The method of claim 23 wherein the step of modifying includes incrementing the amplification of the emitted beams if the sensor signal has a value which is less than the lower threshold.

25. The method of claim 23 wherein the step of modifying includes decrementing the amplification of the emitted beams if the sensor signal has a value which is exceeds the upper threshold.

26. The method of claim 23 wherein the step of modifying includes amplifying the beams received by the beam receivers.

27. The method of claim 23 wherein the step of modifying is completed when the motor is deactivated.

28. A method of controlling a vehicular windshield wiping system including a motor, at least one windshield wiper and an optoelectronic sensor mounted to the windshield for monitoring a portion of the windshield wiped by the wiper during each wipe cycle, the sensor including infrared beam transmitters for emitting beams and infrared beam receivers for receiving the emitted beams, the emitted beams being modified based on the coating on the windshield, the sensor generating a sensor signal having a value which varies as a coating collects on the monitored portion of the windshield, the method comprising the steps of:

establishing a data window based on the sensor signal, the data window having a first plurality of values defined by an upper boundary and a lower boundary; and modifying the amplification of the beams emitted by the beam transmitters if the sensor signal has a value which is outside of the data window.

29. The method of claim 28 wherein the step of modifying includes incrementing the amplification of the emitted beams if the sensor signal has a value which is less than the lower boundary.

30. The method of claim 28 wherein the step of modifying includes decrementing the amplification of the emitted beams if the sensor signal has a value which is exceeds the upper boundary.

31. The method of claim 28 wherein the step of modifying includes amplifying the beams received by the beam receivers.

32. The method of claim 28 wherein the step of modifying is completed when the motor is activated.

33. A method of controlling a vehicular windshield wiping system including a motor, at least one windshield wiper and an optoelectronic sensor mounted to the windshield for monitoring a portion of the windshield wiped by the wiper during each wipe cycle, the sensor including infrared beam transmitters for emitting beams and infrared beam receivers for receiving the emitted beams, the emitted beams being modified based on the coating on the windshield, the sensor generating a sensor signal having a value which varies as a coating collects on the monitored portion of the windshield, the method comprising the steps of:

establishing a data window based on the sensor signal, the data window having a first plurality of values defined by an upper boundary and a lower boundary;

establishing a measurement range within the data window, the measurement range having a second plurality of values defined by an upper threshold and a lower threshold;

modifying the amplification of the beams emitted by the beam transmitters if the sensor signal has a value which is outside of the measurement range when the motor is deactivated; and modifying the amplification of the beams emitted by the beam transmitters if the sensor signal has a value which is outside of the data window when the motor is activated.

34. The method of claim 33 wherein the step of modifying the amplification of the beams emitted by the beam transmitters if the sensor signal has a value which is outside of the measurement range when the motor is deactivated includes incrementing the amplification of the emitted beams if the sensor signal has a value which is less than the lower threshold.

35. The method of claim 33 wherein the step of modifying the amplification of the beams emitted by the beam transmitters if the sensor signal has a value which is outside of the measurement range when the motor is deactivated includes decrementing the amplification of the emitted beams if the sensor signal has a value which is exceeds the upper threshold.

36. The method of claim 33 wherein the step of modifying the amplification of the beams emitted by the beam transmitters if the sensor signal has a value which is outside of the data window when the motor is activated includes incrementing the amplification of the emitted beams if the sensor signal has a value which is less than the lower boundary.

37. The method of claim 33 wherein the step of modifying the amplification of the beams emitted by the beam transmitters if the sensor signal has a value which is outside of the data window when the motor is activated includes decrementing the amplification of the emitted beams if the sensor signal has a value which is exceeds the upper boundary.

* * * * *

UNITED STATES PATENT AND TRADEMARK OFFICE
CERTIFICATE OF CORRECTION

PATENT NO. : 5,276,389
DATED : January 4, 1994
INVENTOR(S) : Juergen Levers

It is certified that error appears in the above-indentified patent and that said Letters Patent is hereby corrected as shown below:

```
Column 17, line 26, claim 12 after "claim" insert --11--.
Column 18, line 35, claim 25, after "which" delete "is".
Column 18, line 67, claim 30, after "which" delete "is".
Column 20, lines 15-16, claim 35 after "which" delete "is".
Column 20, line 29, claim 37, after "which" delete "is".
```

Signed and Sealed this

Twentieth Day of September, 1994

Attest:

BRUCE LEHMAN

Attesting Officer    Commissioner of Patents and Trademarks